United States Patent [19]
Phaal

[11] Patent Number: 5,007,207
[45] Date of Patent: Apr. 16, 1991

[54] ABRASIVE PRODUCT

[76] Inventor: Cornelius Phaal, Glade Cottage, St Anne's Glade, Bagshot, Surrey, GU195EF, England

[21] Appl. No.: 283,620

[22] Filed: Dec. 13, 1988

[30] Foreign Application Priority Data

Dec. 22, 1987 [ZA] South Africa .......... 87/9598

[51] Int. Cl.⁵ .............................. B23F 21/03
[52] U.S. Cl. .................... 51/204; 51/206 R; 51/295
[58] Field of Search .......... 125/39, 22; 51/204, 51/206 R, 295, 307, 309; 76/108 A, DIG. 12; 175/329, 374, 410; 407/118, 119; 408/144, 145, 713

[56] References Cited

U.S. PATENT DOCUMENTS

| | | |
|---|---|---|
| 277,013 | 9/1927 | Triggs . |
| 3,146,560 | 9/1964 | Hurst . |
| 4,255,165 | 3/1981 | Dennis et al. ............ 175/329 X |
| 4,592,433 | 6/1986 | Dennis ............ 175/329 |
| 4,686,080 | 8/1987 | Hara et al. ............ 175/329 X |
| 4,726,718 | 2/1988 | Meskin et al. ............ 175/329 X |
| 4,784,023 | 11/1988 | Dennis ............ 175/329 X |

FOREIGN PATENT DOCUMENTS

| | | |
|---|---|---|
| 0019461 | 11/1980 | European Pat. Off. . |
| 0133386 | 2/1985 | European Pat. Off. . |
| 0214795 | 3/1987 | European Pat. Off. . |
| 0911004 | 3/1982 | U.S.S.R. ............ 175/329 |

Primary Examiner—Frederick R. Schmidt
Assistant Examiner—M. Rachuba
Attorney, Agent, or Firm—Scully, Scott, Murphy & Presser

[57] ABSTRACT

A tool insert comprising an abrasive compact bonded to a cemented carbide support. The cutting edge of the tool is provided by the periphery of the compact. A plurality of circular, concentric recesses, each filled with abrasive compact material, extend into the cemented carbide support from the compact/carbide interface.

2 Claims, 2 Drawing Sheets

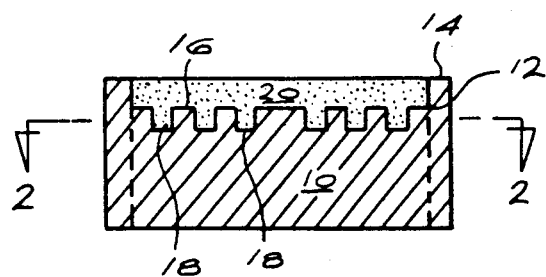
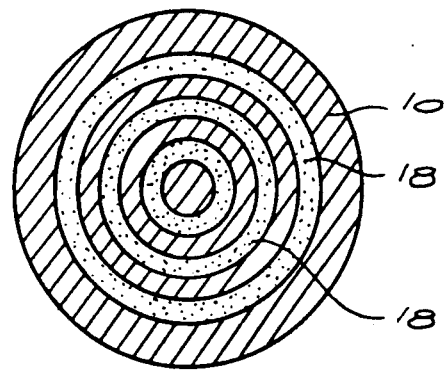
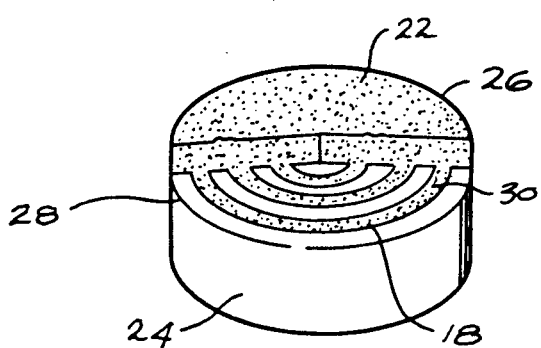
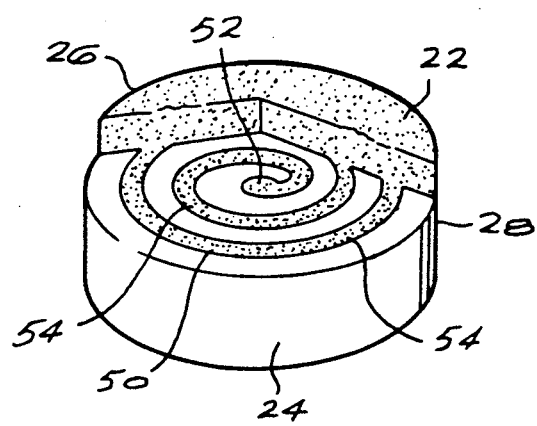

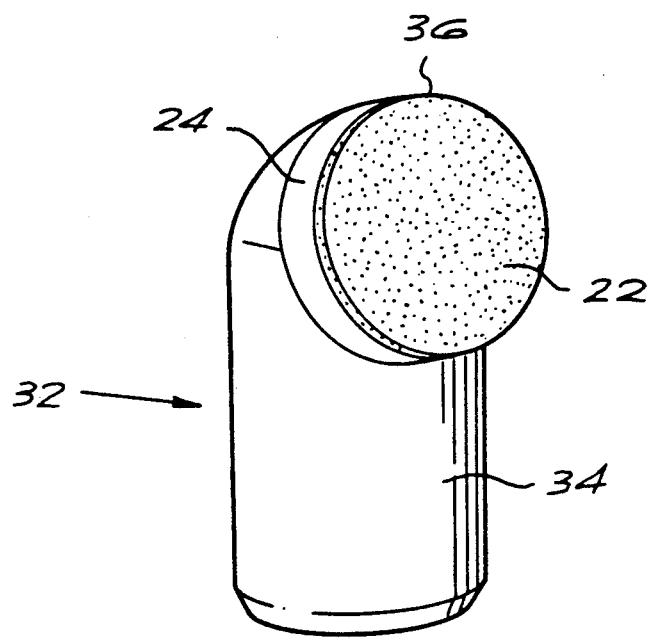
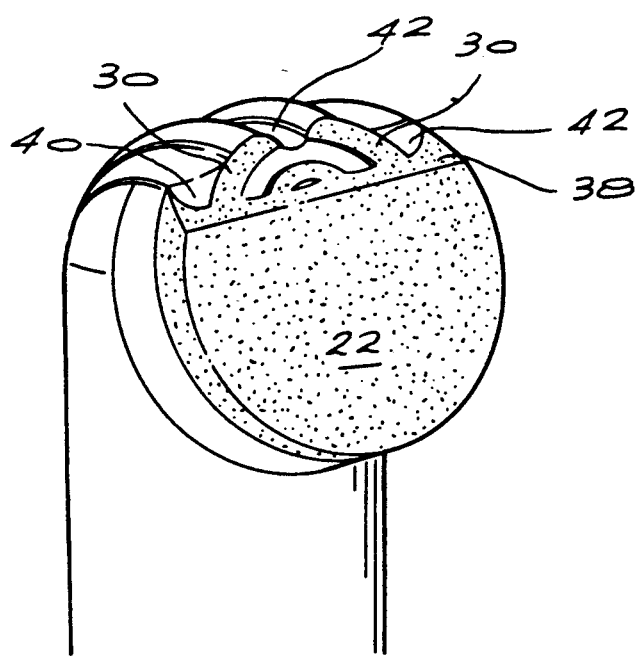

ABRASIVE PRODUCT

BACKGROUND OF THE INVENTION

This invention relates to abrasive products.

Abrasive compacts are used extensively in cutting, milling, grinding, drilling and other abrasive operations. The abrasive compacts consist of polycrystalline diamond or cubic boron nitride particles bonded into a coherent hard conglomerate. The abrasive particle content of abrasive compacts is high and there is an extensive amount of direct particle-to-particle bonding. Abrasive compacts are made under elevated temperature and pressure conditions at which the abrasive particle, be it diamond or cubic boron nitride, is crystallographically stable.

Abrasive compacts tend to be brittle and in use they are frequently supported by being bonded to a cemented carbide substrate. Such supported abrasive compacts are known in the art as composite abrasive compacts. The composite abrasive compact may be used as such in the working surface of an abrasive tool. Alternatively, particularly in drilling and mining operations, it has been found advantageous to bond the composite abrasive compact to an elongate cemented carbide pin to produce what is known as a stud cutter. The stud cutter is then mounted in the working surface of a drill bit or a mining pick.

Recently there has been introduced on to the market a composite diamond abrasive compact known as the "claw" cutter. The "claw" cutter has a diamond compact layer on the cemented carbide substrate and in addition a series of grooves formed in the substrate immediately behind the diamond compact layer and containing diamond compact. During use wear of the compact layer occurs and once this wear reaches the grooved zone, a grooved structure of alternating thick and thin compact ridges develops enabling a longer and more effective abrasive action to take place.

European Patent Publication No. 0177466 describes a cutting element for a drill bit comprising a body of a hard material such as cemented carbide having strips of a diamond substance, for example diamond compact, disposed in grooves formed in a cutting face of the body.

SUMMARY OF THE INVENTION

According to the present invention, there is provided a tool insert comprising a disc-shaped abrasive compact having major flat surfaces on each of opposite sides thereof, at least a part of the periphery of one of the major flat surfaces providing a cutting edge for the insert, a cemented carbide support bonded to the other major flat surface, at least one curved recess located behind the cutting edge and extending into the cemented carbide support from the compact/carbide interface and containing abrasive compact material.

Further according to the invention, there is provided a cutting tool comprising a tool insert as described above mounted in a working surface of the tool and presenting its cutting edge.

The tool insert as described above may be made by a method which includes the steps of providing a cemented carbide body having a flat surface on each of opposite sides thereof, the one flat surface having at least one curved recess formed therein, depositing a layer of compact-forming material on the recessed flat surface so that the material fills the recess and forms a layer on the surface and subjecting the thus formed assembly to elevated conditions of temperature and pressure suitable to produce an abrasive compact of the abrasive compact-forming material.

DESCRIPTION OF DRAWINGS

FIG. 1 illustrates a sectional side view of one embodiment of making a tool insert of the invention;

FIG. 2 illustrates a view along the line 2—2 of FIG. 1;

FIG. 3 illustrates a partially cut-away perspective view of the tool insert produced by the method;

FIG. 4 illustrates the tool insert of FIG. 3 bonded to an elongate pin to form a stud cutter;

FIG. 5 illustrates the stud cutter of FIG. 4 after it has been used in a drilling or like operation;

FIG. 6 illustrates a partially cut-away perspective view of a second embodiment of a tool insert of the invention.

DETAILED DESCRIPTION OF THE INVENTION

The recesses may take the form of a spiral which radiates out from the centre of the abrasive compact. In another form of the invention the recess is one of a plurality of circular concentric recesses located behind the cutting edge.

The recess or recesses will preferably have a cross sectional area of the order of 1 to 8 mm$^2$. For the concentric recesses, each recess will typically be spaced from its nearest neighbour by a distance of the order of 1 to 3 mm. The recess or recesses will extend into the cemented carbide support. Typically, the recess or recesses will extend into the cemented carbide support to a depth of 1 to 3 mm from the compact/carbide interface.

Each recess will contain abrasive compact material. This abrasive compact material will be integral with the layer of abrasive compact which is bonded to the cemented carbide support.

Compact forming material as used herein means material capable of producing an abrasive compact when subjected to compact forming conditions of temperature and pressure. In the case of diamond that material may be diamond particles alone or in admixture with a suitable second phase. The second phase, when used, will invariably consist of or contain diamond catalyst. Similarly in the case of cubic boron nitride abrasive compacts the material will be cubic boron nitride particles alone or in admixture of a suitable second phase. The second phase may consist of or contain a cubic boron nitride catalyst. Abrasive compacts and materials which are used to make them are well known and have been described extensively in the patent literature.

The cemented carbide body may be in the form of a disc. Alternatively, the cemented carbide body may be a disc into one major flat surface of which is formed the recess or recesses.

The cemented carbide body may be any known in the art but is preferably a cemented tungsten carbide body.

The elevated conditions of temperature and pressure necessary to produce abrasive compact of the abrasive compact forming material are well known in the art. Typically, these conditions involve applying a pressure in the range 50–70 kilobars and a temperature in the range 1450°–1600° C. for a period of 10–30 minutes.

An embodiment of the invention will now be described with reference to the accompanying drawings. Referring to FIGS. 1 and 2, there is shown a body 10 of cemented carbide which has a circular, in plan, cavity 12 formed in one major flat surface 14. The base surface 16 of the recess has a plurality of circular concentric recesses 18 formed therein.

Placed on top of the base surface 16 is a mass 20 of fine diamond particles, i.e. up to 100 microns. These fine diamond particles fill each recess 18 as well as the cavity 12.

The loaded disc 10 is placed in a reaction capsule and this capsule then placed in the reaction zone of a conventional high temperature/high pressure apparatus. The contents of the capsule are subjected to a pressure of 55 kilobars and simultaneously a temperature of 1500° C. and these elevated conditions are maintained for a period of 15 minutes. This resulted in the diamond layer 20 forming a diamond compact which was bonded to the carbide body. Each recess 18 was also filled with diamond compact which was integral with the diamond compact layer 20 and bonded to the cemented carbide body.

The product was removed from the reaction capsule and the sides of the disc removed, as illustrated by dotted lines in FIG. 1. After removal of the sides, the resulting product was a tool insert as illustrated by FIG. 3. The tool insert consisted of a diamond abrasive compact layer 22 bonded to a cemented carbide support 24. The periphery 26 of the compact layer 22 provides the cutting edge for the insert. It will be noted from this FIG. and FIG. 2 that the recesses are arranged in a series of concentric rings located behind the peripheral cutting edge 26. Each recess extends into the carbide support 24 from the carbide/compact interface 28. Each recess is filled with diamond compact material 30 which is integral with the compact layer 22 and bonded to the carbide support 24.

The tool insert of FIG. 3 will typically be bonded to a cemented carbide pin to form a stud cutter 32. Such a stud cutter and its wear pattern in use is illustrated by FIGS. 4 and 5. Referring to these FIGS., it will be seen that the tool insert of FIG. 3 comprising the diamond abrasive compact layer 22 bonded to the cemented carbide support 24 is bonded through the carbide support 24 to an elongate cemented carbide pin 34. The top edge 36 of the compact layer 22 provides the cutting edge for the stud cutter.

In use, the stud cutter will be mounted in a drill bit in known manner so that the cutting edge 36 is exposed and available to contact the surface to be drilled. Wear of the cutting edge occurs under the severe conditions encountered in drilling so that a wear plane 38, as illustrated in somewhat exaggerated manner by FIG. 5, develops. It will be noted that the wear plane 38 extends across the compact layer 22 and across a portion 40 of the carbide support 24. As wear takes place so the compact material 30 in the recesses 18 is exposed. This compact material 30 wears much slower than the carbide in the regions 42 with a result that a depression or shallow cavity develops in the regions 42 between adjacent compact material regions 30. These regions 30 form, in effect, curved cutting ridges or projections which enhance the cutting action.

FIG. 6 illustrates a second embodiment of a tool insert and like parts carry like numerals. In this embodiment the recess has the form of a spiral 50 radiating out from the center 52 of the insert. The spiral recess is filled with abrasive compact material 54.

I claim:

1. A tool insert comprising a disc-shaped abrasive compact having major flat surfaces on each of opposite sides thereof, at least a part of the periphery of one of the major flat surfaces providing a cutting edge for the insert, a cemented carbide support bonded to the other major flat surface, at least one curved recess located behind the cutting edge and extending into the cemented carbide support from the compact and carbide interface and containing abrasive compact material, said recess having the form of a spiral radiating out from the center of the abrasive compact.

2. A tool insert comprising a disc-shaped abrasive compact having major flat surfaces on each of opposite sides thereof, at least a part of the periphery of one of the major flat surfaces providing a cutting edge for the insert, a cemented carbide support bonded to the other major flat surface, and a plurality of circular, concentric recesses being located behind the cutting edge and extending into the cemented carbide support from the compact and carbide interface and containing abrasive compact material.

* * * * *